United States Patent

Hensler et al.

Patent Number: 5,125,682
Date of Patent: Jun. 30, 1992

[54] IMPACT PROTECTION DEVICE FOR AN OCCUPANT OF A MOTOR VEHICLE

[75] Inventors: Wolfgang Hensler, Tübingen; Manfred Müller, Deizisau; Egon Katz, Nagold; Guido Wetzel, Sindelfingen; Luigi Brambilla, Böblingen, all of Fed. Rep. of Germany

[73] Assignee: Mercedes-Benz AG, Fed. Rep. of Germany

[21] Appl. No.: 680,352

[22] Filed: Apr. 4, 1991

[30] Foreign Application Priority Data

Apr. 4, 1990 [DE] Fed. Rep. of Germany ....... 4010767

[51] Int. Cl.⁵ .................................................. B60R 21/22
[52] U.S. Cl. .................................. 280/730; 280/731; 280/743
[58] Field of Search .............. 280/728, 729, 730, 731, 280/743

[56] References Cited

U.S. PATENT DOCUMENTS 3,874,693  4/1975  Patzelt et al. ............... 280/743
3,938,824  2/1976  Patzelt ........................ 280/743
3,945,665  3/1976  Tsutsumi et al. ............ 280/731

FOREIGN PATENT DOCUMENTS 1954398  5/1971  Fed. Rep. of Germany .
2152902  4/1973  Fed. Rep. of Germany .
2256720  5/1974  Fed. Rep. of Germany .

Primary Examiner—Charles A. Marmor
Assistant Examiner—Tamara L. Finlay
Attorney, Agent, or Firm—Evenson, Wands, Edwards, Lenahan & McKeown

[57] ABSTRACT

An impact protection device for an occupant of a motor vehicle having an air bag. The air bag is arranged folded up in a receptacle fixed to the vehicle and can be inflated by a filler gas. An air bag surface facing a vehicle occupant being limited in its movement towards the vehicle occupant in the center region by a restraining device. The restraining device is formed by a cover plate over the receptacle which is connected to the vehicle by short limiting straps, so that on unfolding the air bag extends around the periphery and in the direction of the vehicle occupant in front of the cover plate.

10 Claims, 1 Drawing Sheet

IMPACT PROTECTION DEVICE FOR AN OCCUPANT OF A MOTOR VEHICLE

BACKGROUND AND SUMMARY OF THE INVENTION

The invention relates to an impact protection device for an occupant of a motor vehicle having an air bag which is arranged folded up in a receptacle fixed to the vehicle and which can be inflated by means of a filler gas, an air bag surface facing a vehicle occupant being limited in its movement towards the vehicle occupant by a restraining device in the center region, which restraining device includes a holding part which rests against the air bag and is connected to the vehicle via limiting straps.

In German Pat. Document No. DE-PS 21 52 902 an impact protection device for the occupant of a motor vehicle is described, which comprises an air bag to which an internal restraining device is assigned which limits the expansion of the air bag towards a vehicle occupant. The restraining device is formed by an impact surface connected to the air bag and by cables holding the said impact surface. The additional necessary impact surface part must be fastened to the air bag from inside. Due to the long limiting straps (cables) an unfolding momentum of the center region of the air bag towards the vehicle occupant is still possible.

The German DOS 19 54 398 shows a protection device with a foamed material which expands in the event of danger and on which a cover cap of the protection device continues to be seated on the expansion of the foamed material. This cover cap does not limit the expansion of the foamed material towards a vehicle occupant and is also moved to the greatest extent in the direction of the vehicle occupant.

The invention is based on the object of advantageously using a device part, customary in an impact protection device, for a restraining device of the generic type mentioned above.

The object is achieved by means of an arrangement wherein the holding part is formed by a cover plate for a receptacle for the folded up air bag and wherein the limiting straps are limited in their length in such a way that the cover plate is covered in the direction of the vehicle occupant by the inflated air bag.

By means of the short limiting straps, which permit only a lateral emergence of the air bag at the periphery around the cover plate, it is achieved that after the unfolding of the air bag in the direction of the vehicle occupant the cover plate remains behind the air bag. In this respect it is particularly cost-effective that the existing cover plate which is already required and which covers the folded up air bag in a receptacle fixed to the vehicle can be used as a restraining device.

Furthermore, by means of the design or of the materials of the limiting straps it can be achieved that upon the stressing of the cover plate the straps have to be shortened again by the vehicle occupant with a consumption or degradation of energy. As a result, the stress on the occupant is in turn reduced in the event of a secondary impact against the cover plate. Here, limiting straps are to be designed to correspond to folded steel straps or even as springs, preferably damped.

The cover plate can also be connected to keep the air bag from slipping out from the cover plate on one side, which, due to the fact that the cover plate is seated on the outer surface of the air bag, requires no expenditure.

Other objects, advantages and novel features of the present invention will become apparent from the following detailed description of the invention when considered in conjunction with the accompanying drawings.

DETAILED DESCRIPTION OF THE DRAWINGS

Figure 1:
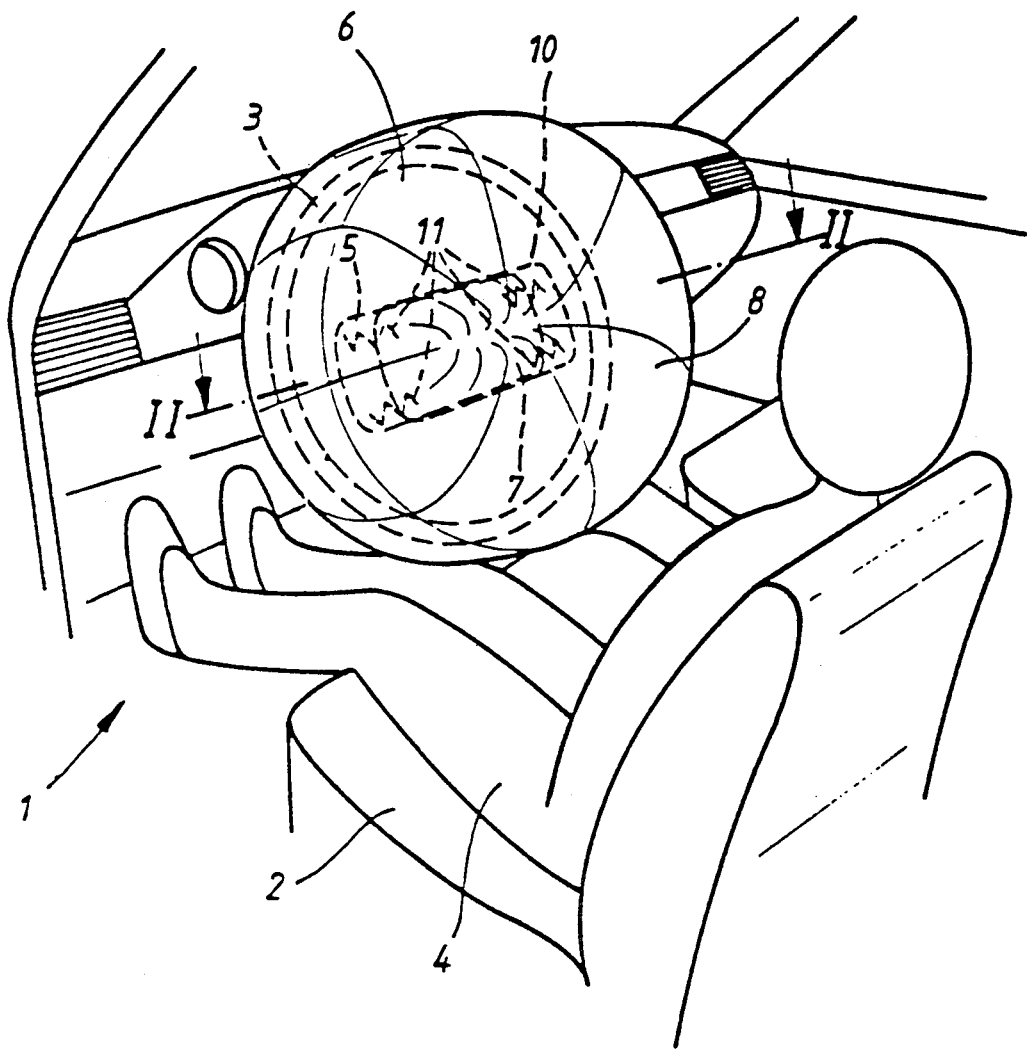
FIG. 1 is a schematic view which shows a section of a passenger compartment of a motor vehicle with an inflated driver air bag in front of a steering wheel.
Figure 2:
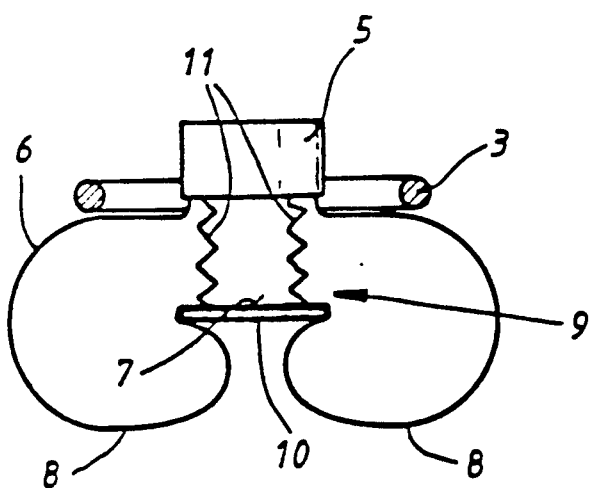
FIG. 2 shows a section through the impact protection device in FIG. 1 along the line II—II in a simplified, sketched-like illustration.

FIG. 1 shows a vehicle passenger compartment 1 of a motor vehicle, in which a steering wheel 3 is arranged in front of a seat 2. So that a vehicle occupant 4 sitting on the seat 2 does not impact against the steering wheel 3 and possibly injure himself in the event of an accident, an air bag 6 is provided. A gas generator is fixed to the floor of a receptacle 5 which receives an air bag 6 folded together over the gas generator. The air bag 6 is filled up by means of gases from the gas generator in fractions of a second and now projects, with the function of an impact protection device, in front of the steering wheel 3 against the vehicle occupant 4, in order to intercept the latter gently.

So that the center region 7 of an air bag surface 8 facing the vehicle occupant 4 cannot exert too strong an unfolding impetus towards the vehicle occupant 4 when the air bag 6 unfolds, the center region 7 of the air bag 6 is limited in its movement towards the vehicle occupant 4 by a restraining device 9 which supports the air bag in the receptacle 5, fixing it to the steering wheel.

The restraining device 9 comprises a cover plate 10, which, in the state of rest, covers the receptacle 5 on top of the folded up air bag 6, and which is lifted up from the receptacle 5 by the air bag 6 as it fills. The cover plate 10 is held in the receptacle 5 by limiting straps 11, which are kept short.

As a result of this design of the restraining device 9, on unfolding the air bag 6 is expanded around the periphery of the cover plate 10 with the short limiting straps 11 and the unfolding impetus of the air bag 6 in the direction of the vehicle occupant 4 is reduced.

The short limiting straps 11 can permit an additional impact energy degradation if they are formed of a material or have a shape which gives them a certain degree of shortening resistance after the unfolding of the air bag 6, in that the vehicle occupant 4 impacting against the air bag 6 shortens the limiting straps 11 again.

A contemplated design of the limiting straps 11 would be as a folded steel strap or as a spring which is stretched on the unfolding of the air bag 6 and can be shortened again, under the effect of energy degradation, by the stressing of the cover plate 10. So that the air bag 6 does not emerge laterally on one side of the cover plate 10 on unfolding, the air bag and cover plate can be connected to one another in planar fashion. In addition, the shape of the air bag 6 makes it possible that after unfolding it forms bulges that collide in front of the cover plate 10 and again forms an approximately continuous air bag surface 8.

Although the invention has been described and illustrated in detail, it is to be clearly understood that the same is by way of illustration and example, and is not to be taken by way of limitation. The spirit and scope of the present invention are to be limited only by the terms of the appended claims.

WHAT IS CLAIMED:

1. Impact protection device for an occupant of a motor vehicle having an air bag which is arranged folded up in a receptacle fixed to the vehicle and which can be inflated by means of a filler gas, an air bag surface facing a vehicle occupant being limited in its movement towards the vehicle occupant by a restraining device in the center region, which restraining device includes a holding part which rests against the air bag and is connected to the vehicle via limiting straps, wherein the holding part is formed by a cover plate for a receptacle for the folded up air bag, and wherein the limiting straps are limited in their length in such a way that the cover plate is covered in the direction of the vehicle occupant by the inflated air bag.

2. Impact protection device according to claim 1, wherein the receptacle is fixed to the vehicle.

3. Impact protection device according to claim 2, wherein upon the filling of the air bag, the limiting straps are dimensioned and configured so they can be stretched and then compressed again under the effect of the absorption of energy.

4. Impact protection device according to claim 2, wherein the limiting straps are elastically stretchable.

5. Impact protection device according to claim 4, wherein the air bag has an inflated shape by means of which it forms bulges that collide in front of the cover plate.

6. Impact protection device according to claim 2, wherein the cover plate is connected in planar fashion to the air bag.

7. Impact protection device according to claim 6, wherein the air bag has an inflated shape by means of which it forms bulges that collide in front of the cover plate.

8. Impact protection device according to claim 2, wherein the air bag has an inflated shape by means of which it forms bulges that collide in front of the cover plate.

9. Impact protection device according to claim 1, wherein the cover plate is connected in planar fashion to the air bag.

10. Impact protection device according to claim 1, wherein the air bag has an inflated shape by means of which it forms bulges that collide in front of the cover plate.

* * * * *